Aug. 30, 1966   J. R. RHODES   3,270,200
METHOD AND APPARATUS FOR MEASURING THE CONCENTRATION OF
AN ELEMENT IN A MIXTURE BY AN X-RAY ABSORPTION
ANALYSIS TECHNIQUE
Filed June 17, 1963   6 Sheets-Sheet 1
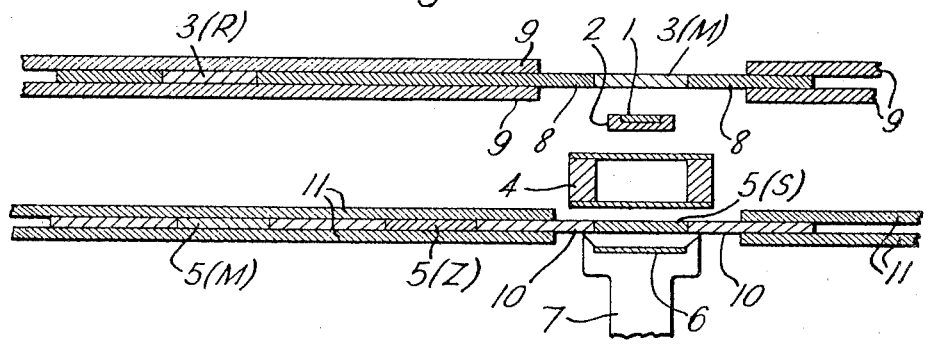
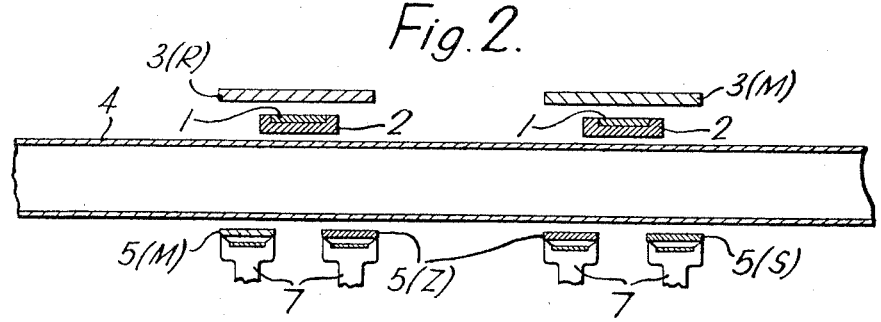

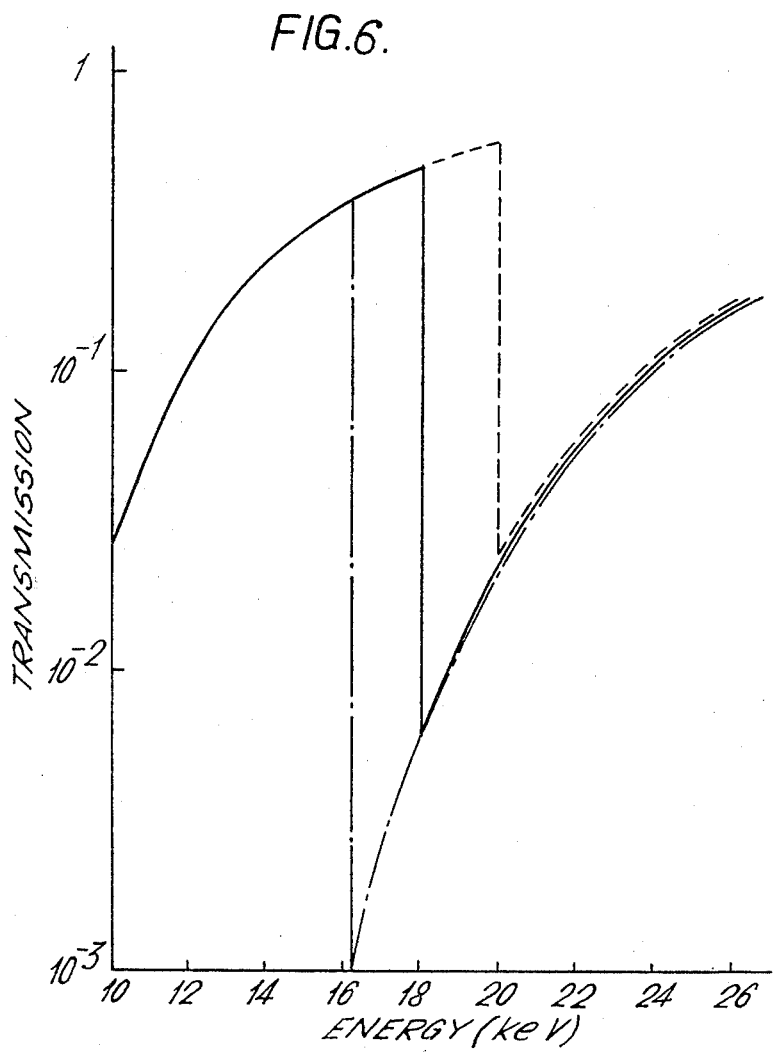

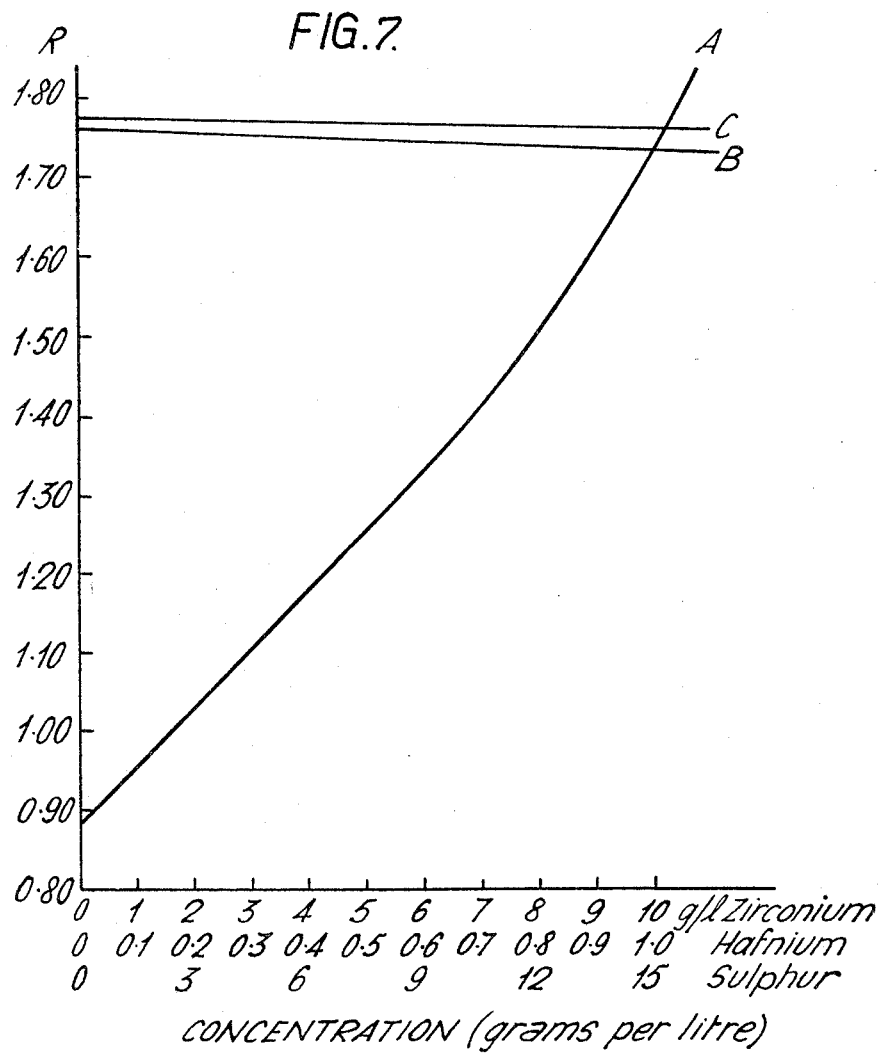

United States Patent Office 3,270,200
Patented August 30, 1966

3,270,200
METHOD AND APPARATUS FOR MEASURING THE CONCENTRATION OF AN ELEMENT IN A MIXTURE BY AN X-RAY ABSORPTION ANALYSIS TECHNIQUE
John Rathbone Rhodes, Wallingford, England, assignor to United Kingdom Atomic Energy Authority, London, England
Filed June 17, 1963, Ser. No. 288,189
Claims priority, application Great Britain, June 20, 1962, 23,704/62
10 Claims. (Cl. 250—43.5)

The present invention relates to radiometric analysis techniques.

It is well known that the concentration of an element (hereinafter called the "required" element) can be determined by making measurements of the degree of absorption that takes place when X-rays or gamma rays are transmitted through a sample of known mass per unit area. However, difficulty often arises when the sample that is being analysed contains one or more other elements (hereinafter called "interfering elements") which are effective absorbers of radiation if it is not possible to control the proportions of the required element to the interfering elements. It has been proposed that this problem should be overcome by the use of fluorescent techniques (as opposed to absorption techniques) and it will be known that in the conventional fluorescent analysis technique, the typical X-rays of the required element are excited by a suitable source of radiation and the intensity of the excited radiation is measured. Unfortunately this technique is subject to inter-element effects which are sometimes relatively large.

The object of the present invention is to provide for a process of and apparatus for testing or analysis which has a wide degree of utility but in which the difficulties due to interfering elements is reduced as compared with the previous techniques.

According to the present invention, there is provided a process of testing primarily to determine the concentration of a required element, which comprises determining two absorption co-efficients of a sample containing such element by using two energies of exciting X-rays selected so as to be close to the top and bottom respectively of an absorption edge of such element. The exciting X-rays being effectively substantially monochromatic, whereby the concentration of the required element may be determined.

By using substantially monochromatic X-ray beams in contrast to the continuous spectra previously proposed, the mass absorption co-efficients of the interfering elements will be substantially the same for the two beams. However, in the case of the required element, since the energies of these two beams are near the top and bottom of an absorption edge, the mass absorption co efficients will be substantially different. Consequently by measuring the difference in the two absorption co-efficients, the quantity of the required element can be determined. In order to obtain the maximum effect it is preferred to choose the K absorption edge.

The preferred method of generating the required monochromatic X-ray beams is to use a bremsstrahlung source (which is cheap and compact but which gives a substantially continuous spectrum) and to cause its radiation to fall on two selected targets so as to generate the characteristic fluorescent X-rays, preferably K X-rays, of the targets which are used for the actual determination. Unwanted radiation outside the required bands is desirably filtered out by means of suitable differential filters. It is not essential to use a bremsstrahlung source as other radioactive sources, e.g. americium–241 or cadmium–109, can be used provided they have an energy component higher than the absorption edges of the target elements. In these arrangements, the targets in which the fluorescent X-rays are generated should have characteristic K radiations differing by less than 5% from the absorption edge of the required element.

Thus, according to a further aspect of the present invention there is provided apparatus for determining the concentration of a required element which comprises a continuous spectrum source of radiation, two targets constituted by elements having respectively a characteristic radiation energy within 5% of the top and bottom of an absorption edge of the required element, a pair of differential filters for association with each target and selected so as to permit the passage of substantially monochromatic fluorescent X-rays from the target and X-ray detection means in the form of a counter adapted to be located on the side of the sample remote from the targets.

Preferably a scintillation counter is used.

The present invention is particularly applicable to the detection and analysis of elements when in the presence of other elements that would interfere with chemical analysis, for example zirconium in the presence of hafnium, but the invention is also applicable to thickness measurements and many other techniques which at the present time suffer from the disadvantages inherent in the presence of an interfering element. Thus, for example, the present invention may readily be used to measure the thickness or density of an element if the concentration is known, or its abundance if the mass per unit area of the sample is known.

It must be emphasised that it is most important to the success of the present invention, that the radiation which is used for the measurement of absorption by the required element should be effectively substantially monochromatic and consequently the conventional bremsstrahlung source cannot be used by itself and, similarly, a source of $\beta$ excited K X-rays cannot be used, as the excited bremsstrahlung is always at least as intense as the K X-rays and filters are incapable of successfully discriminating against the intensity of radiation outside the required bands.

By the term "a pair of differential filters" is meant a pair of filters, one of which is the required element and the other of which has a critical absorption edge as close to that of the required element as possible. However, two of these differential filter pairs are required and they are so chosen that in each case the required element forms one of the filters whilst the other filter in each pair is selected so to define a pass band of energies which includes the characteristic K X-rays of the targets. Thus in effect for the X-rays of each target, one of the filters will be transparent while the other is opaque. The thickness of the filters are adjusted experimentally so as to be inversely proportional to their mass absorption co-efficients outside the energy "pass band" for a purpose which will be clear hereinafter. It should also be noted only although two differential filter pairs are provided only three actual filters are necessary in the simplest embodiment.

In order that the invention may more readily be understood, one embodiment of the same will now be described with reference to the accompanying drawings, wherein:

FIG. 1 is a schematic representation of the apparatus of the invention.

FIG. 2 is a schematic representation of a modification of the apparatus suitable for continuous analysis.

FIG. 6 is a diagram illustrating the effect of filters, and

FIG. 7 is a calibration curve.

Figure 4:
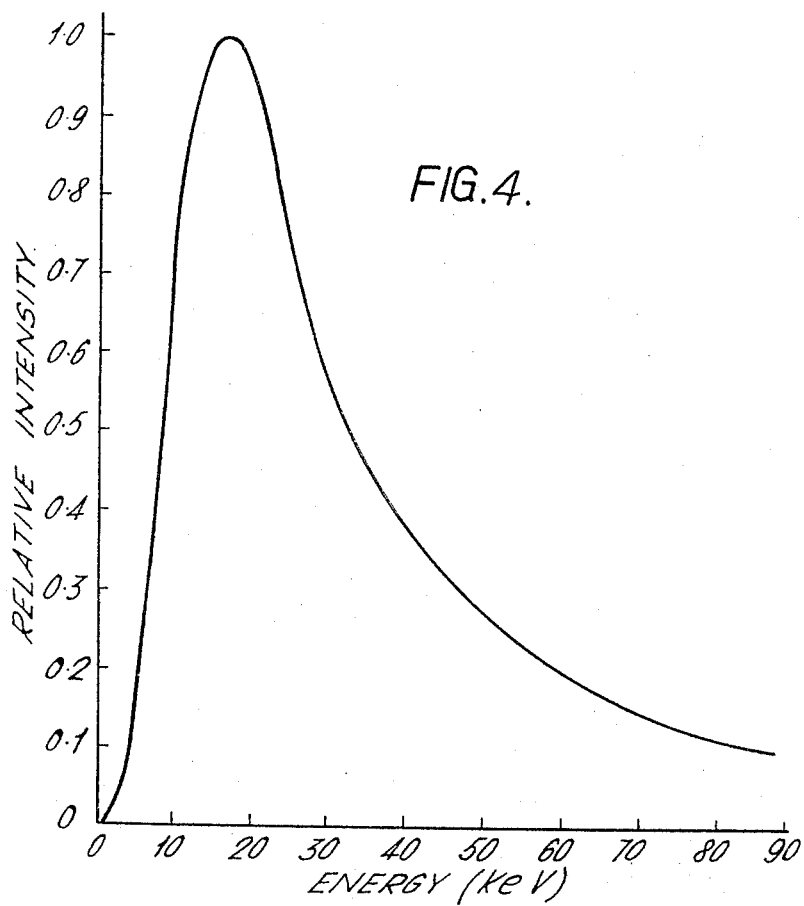
FIG. 4 is a diagram showing the spectrum from the source.

Referring firstly to FIG. 1, this particular embodiment is designed to estimate the quantity of zirconium present in a solution containing zirconium, hafnium and sulphuric acid. The apparatus comprises a promethium–147/aluminium bremsstrahlung source 1 contained in a gold source holder 2, the base of which is of sufficient thickness to absorb all the radiation emitted from the back of the source 1. As shown in FIG. 4, the output from this source is a continuous spectrum having a peak at about 16 kev. and an average energy of about 25–30 kev. although these figures vary from source to source. The radiation from the source 2 is arranged to strike one of two targets which, in this embodiment, are of molybdenum 3(M) and ruthenium 3(R). The characteristic fluorescent X-rays from the particular target in use then pass through a perspex sample holder 4. After passing through the sample holder, the radiation passes through one of the differential filters 5 and thence through a berryllium window 6 to a detector 7 which is a scintillation counter having a sodium iodide crystal and which is associated with a photomultiplier.

In the embodiment shown in FIG. 1, the two targets 3M and 3R are both secured in a support plate 8 which is free to slide between guide members 9. Thus, by movement of the plate 8, either one of targets 3M or 3R may be located above source 1 as desired. In a similar manner there are provided three filters 5 of strontium 5(S), zirconium 5(Z) and molybdenum 5(M), which effectively form two pairs of differential filters, one pair for each of the targets 3. The filters 5 are secured in a supporting plate 10 which is free to slide between guide members 11, whereby any of the three filters may be located in the path of the X-rays from one of the targets 3 to the detector 7.

Figure 5:
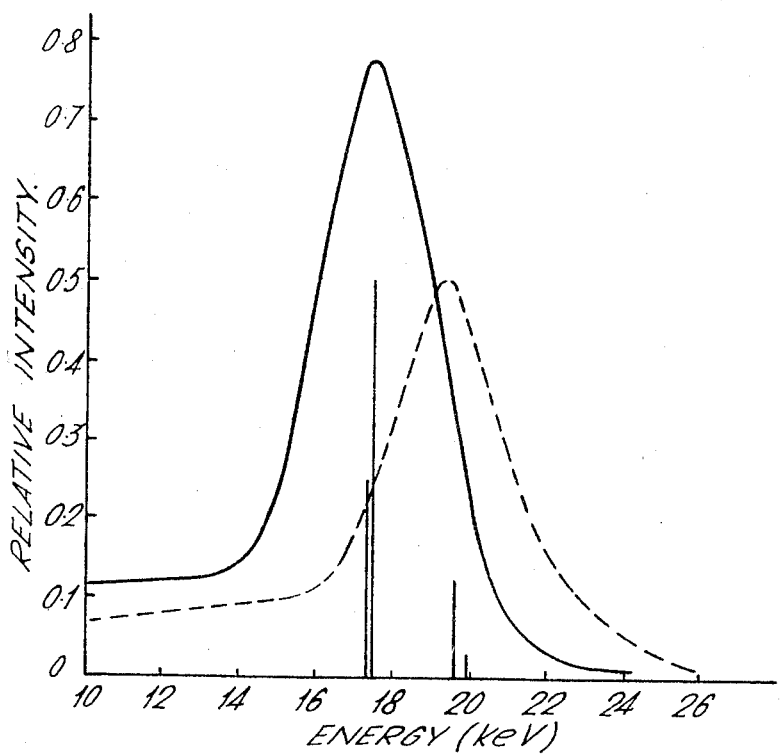
FIG. 5 is a diagram showing the spectra from the targets.

The continuous radiation (FIG. 4) from the source 1 on striking the target 3 gives rise to a line spectrum together with a scattered continuum mainly below about 14 kev. The line spectrum is composed of four lines identified as $K_{\alpha 1}$, $K_{\alpha 2}$, $K_{\beta 1}$ and $K_{\beta 2}$. In the case of the molybdenum target these have relative intensities of 100, 50.1, 23.6 and 4.0 energies of 17.478, 17.373, 19.607 and 19.964 kev. respectively and are shown in FIG. 5 as straight lines. For reasons which will be apparent hereinafter the $K_\beta$ lines may be ignored. If the spectrum is measured with a proportional counter, the full line curve of FIG. 5 is obtained. The spectrum from the ruthenium target is shown in dotted lines.

FIG. 6 is a graph showing the transmission of the filters plotted against energy, the chain dotted line corresponding to the strontium filter, the full line to the zirconium filter and the dotted line to the molybdenum filter. Below 16.1 kev. the thick line signifies that the three curves are identical as the thicknesses of the filters are adjusted to obtain this effect. If this factor is combined with the attenuation of the radiation passing therethrough the apparatus of the present invention is substantially insensible to the scattered and other radiation below 16.1 kev. Using plain filters, the curves of FIG. 6 will not be superimposed above 20 kev. as the change in absorption ratios ("absorption jump ratio") for the filters are not identical. This may be overcome, if desired, by adding a further filter (with no absorption edge in the required band of energies) to the filters with the larger jump ratio. In this particular case the strontium filter is made my mixing the fluoride with a resin such as that sold under the registered trademark "Araldite" and so is contaminated by fluorine, carbon, etc. and the zirconium and molybdenum filters may therefore have secondary aluminum filters added. All the filters are balanced experimentally by careful grinding, polishing or etching.

It is important that the filters be correctly balanced below 16.1 kev. so as to cut out the scattered radiation which is high in this region (see FIG. 5) and also so as to cut out the fluorescent K X-rays of the required element. It is desirable that they be balanced above 20 kev. in order to cut out the high energy scattered radiation which is relatively well transmitted by the sample.

In a complete determination using the apparatus of FIG. 1, counts are made with firstly the molybdenum target 3(M), using in turn the strontium filter 5(S) and the zirconium filter 5(Z), and then a further two counts are made with the ruthenium target 3(R) using the zirconium filter again and then the molybdenum filter 5(M). It can be seen from FIG. 3 that the $K_\alpha$ X-rays from the molybdenum target, which have an energy of 17.5 kev., are just below the K absorption edge of zirconium at 18.0 kev. and these characteristic X-rays are effectively isolated by the differential filter arrangement which includes the zirconium and strontium filters having absorption edges at 18.0 kev. and 16.1 kev. respectively.

As can be seen from FIG. 6 the strontium and zirconium filters have substantially identical transmission characteristics outside the band 16.1 to 18.0 kev., and thus by subtracting their counts, this extraneous radiation is cut out. Within this band, the strontium filter is opaque whilst the zirconium filter is transparent. If therefore the count through the strontium filter is subtracted from the count through the zirconium filter, the resultant net count rate will be effectively equal to that which would be obtained using monochromatic molybdenum K X-rays.

Similarly, by the use of the zirconium and molybdenum filters, the ruthenium K X-rays are effectively isolated and the zirconium content of the sample is dependent on the ratio of the resultant effective count rates using these two targets.

The theoretical basis of the invention will now be described with reference to the above specific embodiment.

For all elements $i$ in a mixture of elements forming the sample, the ratio of the intensities of transmitted to incident radiation of energy E is:

$$I/I_0 = \exp -m \sum_i \mu_i r_i \qquad (1)$$

where:

I is intensity of transmitted energy
$I_0$ is intensity of incident energy
$m$ is total mass per unit area of the sample
$\mu_i$ is mass absorption co-efficient of element $i$
$r_i$ is proportion by weight of element $i$ For a different energy E':

$$(I/I_0)' = \exp -m \sum_i \mu_i r_i \qquad (2)$$

In accordance with this invention, however, where the absorption edge of the required element (zirconium) has an energy $E_K$ (18.0 kev.) we chose E to be slightly less than $E_K$ and E' to be slightly greater than $E_K$ and we can rewrite the Equations 1 and 2 as follows:

$$I/I_0 = \exp -m(\mu_1 r + \sum_j \mu_j r_j) \qquad (3)$$

$$(I/I_0)' = \exp -m(\mu_2 r + \sum_j \mu'_j r_j) \qquad (4)$$

where:

suffix $j$ refers to all the other elements in the sample
$r$ is proportion by weight of zirconium
$\mu_1$ is mass absorption co-efficient of zirconium at energy E and $\mu_2$ is mass absorption co-efficient of zirconium at energy E'.

Because E is nearly equal to E', for any element $j$ (i.e. all elements except zirconium) $\mu_j$ is nearly equal to $\mu'_j$, but $\mu_1$ is much smaller than $\mu_2$.

Hence $$R = \frac{I/I_0}{(I/I_0)'} = \exp mr(\mu_2 - \mu_1) \quad (5)$$

Consequently therefore the ratio R is dependent only on the amount of zirconium ($r$) and the sample mass per unit area ($m$).

In the above described embodiment, the required element is zirconium, the X-ray energy E is 17.5 kev. and E' is 19.3 kev. At these energies the mass absorption co-efficients $\mu_1$ and $\mu_2$ are respectively 15.8 and 8.5 approximately as can be seen from FIG. 3.

In Equation 5, the terms $m$, $\mu_1$ and $\mu_2$ are known and the terms I, I', $I_0$ and $I'_0$ are determined from the count rates as follows:

$$I = C_1 - C_2 \quad (6)$$
$$I' = C_3 - C_4 \quad (7)$$
$$I_0 = C'_1 - C'_2 \quad (8)$$
$$I'_0 = C'_3 - C'_4 \quad (9)$$

where the count rates C are determined as follows:

| Filter | Sample cell full | | Sample cell empty | |
|---|---|---|---|---|
| | Molybdenum target | Ruthenium target | Molybdenum target | Ruthenium target |
| Strontium | $C_2$ | | $C'_2$ | |
| Zirconium | $C_1$ | $C_4$ | $C'_1$ | $C'_4$ |
| Molybdenum | | $C_3$ | | $C'_3$ |

In practice for any given experimental set up, the counts taken with the sample cell empty are constant and therefore the ratio $(I/I_0)'$ is constant, so that the counts $C'_1$, $C'_2$, $C'_3$ and $C'_4$ are only taken at the beginning of a series of experiments.

FIG. 7 shows three curves in which the values of R obtained in this way are plotted for solutions containing 16 g./l. sulphur, no hafnium and variable amounts of zirconium (curve A); 16 g./l. sulphur, 10 g./l. zirconium and variable amounts of hafnium (curve B); and 10 g./l. zirconium, no hafnium and variable amounts of sulphur (curve C). It can be seen that the zirconium content can be determined substantially independently of the sulphur or hafnium contents.

Figure 3:
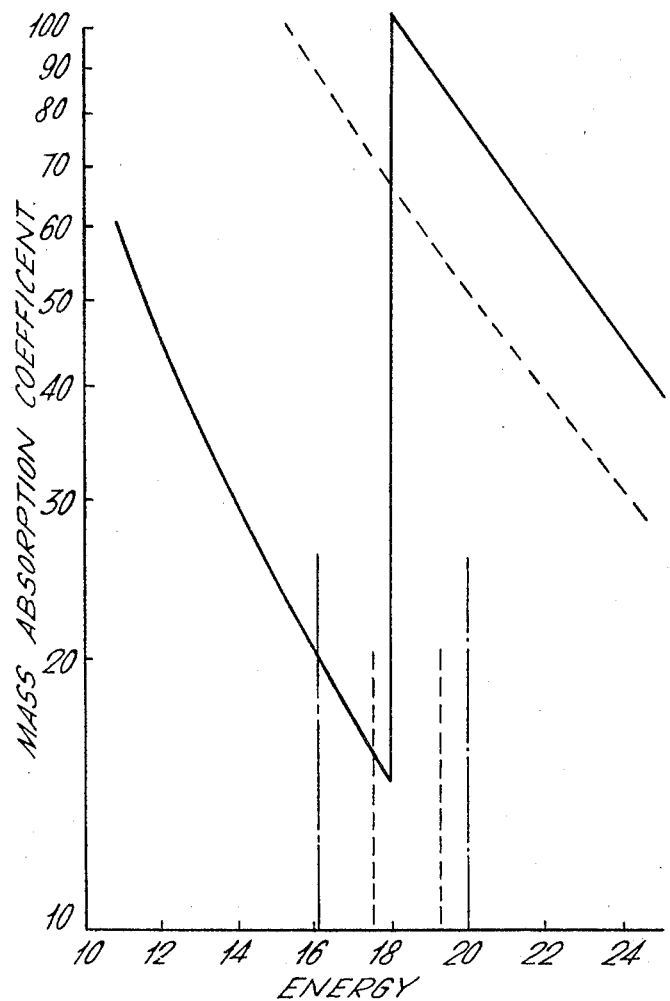
FIG. 3 is a diagram showing the mass absorption co-efficients of certain elements.

The determination of zirconium cannot be made absolutely independent of the concentrations of these other elements for reasons which will be apparent by reference to FIG. 3. This figure shows in full lines the mass absorption curve for zirconium and in dotted lines part of the curve for hafnium. Also shown in chain dotted lines (vertical) are the positions of the K absorption edges of strontium and molybdenum at 16.1 and 20.9 kev. respectively. Dotted lines (vertical) show the positions of the K X-ray energies of the targets molybdenum and ruthenium at 17.5 and 19.3 kev. respectively.

It can be seen that although in deriving Equation 5, it has been assumed that $\mu_j = \mu'_j$ this is only approximately so when $j$ is hafnium for $\mu_j = 71$ and $\mu'_j = 55$. The slight slope of curve B in FIG. 7 emphasizes this point. Similarly the fact that curve C is substantially horizontal is by reason that, if $j$ is sulphur, $\mu_j = 8$ and $\mu'_j = 7$. The curves emphasize that experimental results are close to those predicted by theory so that the making of a calibration curve is not always necessary.

Thus the present invention provides a process and apparatus for determining the quantity of an element present in a sample, substantially independently of the presence of other elements.

The apparatus of FIG. 2 shows a modification which is suitable for continuous measurement. The sample flows past the apparatus in a pipe 4, which is equivalent to the sample holder 4 of the apparatus of FIG. 1. The apparatus consists of two sources, one of which has associated with it a molybdenum target 3(M) and the other a ruthenium target 3(R). On the side of the pipe 4 remote from the source and target 3(M) are located two detectors 7, one of which has a strontium filter 5(S) to give a count $C_2$, and the other a zirconium filter 5(Z) to give a count $C_1$. In a like manner, two detectors 7, with filters 5(Z) and 5(M) giving counts $C_4$ and $C_3$, respectively, are located on the side of the pipe 4 remote from the source and target 3(R). Thus counts $C_1$, $C_2$, $C_3$ and $C_4$ are obtained simultaneously, and by means of suitable electronic equipment a continuous display of the ratio $(C_1-C_2)/(C_3-C_4)$ may be obtained which is proportional to the concentration of zirconium in the solution in the tube.

As a further example, the invention readily permits the determination of copper in the presence of iron, but if conventional fluoroescence techniques are adopted, an appreciable proportion of the characteristic K X-rays of copper at 8.0 kev. are absorbed and re-emitted as iron K X-rays at 6.4 kev. so that determination is rendered difficult.

The technique of using the absorption edge has been previously proposed for use with conventional X-ray tubes and in such prior arrangement the continuous spectrum from an X-ray tube, which is of course large, heavy, expensive and requiring power supplies, is passed through the specimen and a crystal goniometer is used to isolate the X-rays of the critical energy; such a goniometer is an expensive and delicate piece of apparatus and the resolution is such that the incident X-ray beam must be intense as the geometrical losses are of the order of $10^6$ to $10^7$. The present invention permits, in one embodiment, the replacement of these two items by a bremsstrahlung source, two targets and three filters, all of which are small, simple, cheap and robust.

I claim:

1. A process for measuring the concentration of a required element in a mixture by an X-ray absorption analysis technique comprising the steps of selectively directing X-rays having a continuous spectrum onto a first one of two selected targets, whereof said first one of said targets has characteristic fluorescent X-rays of energy just below an absorption edge of the said required element, and the second of said targets has characteristic fluorescent X-rays of energy just above the said absorption edge of the required element, thereby to excite said fluorescent X-rays of the first target, passing such fluorescent X-rays through the said mixture, through one filter of a pair of differential filters, of which one filter is selected to have an absorption edge slightly below the energy of the fluorescent X-rays of the first target and the other filter is selected to have an absorption edge slightly above the energy of the fluorescent X-rays of the first target, the pair of filters having essentially the same absorption characteristics outside the energy band between the absorption edges of the filters, measuring the intensity of the filtered X-rays, passing the fluorescent X-rays from the first target through the said mixture and through the other filter of the said pair of differential filters, measuring the intensity of the filtered X-rays, determining the difference between the two measured intensities, repeating the whole of such process using the second of said targets and a different pair of differential filters to obtain a second difference between two measured intensities, determining the ratio of said differences and comparing such ratio with a suitable calibration curve to determine the concentration of the said required element.

2. A process for measuring the concentration of a required element in a mixture by an X-ray absorption analysis technique as set forth in claim 1, wherein said X-rays having a continuous spectrum are bremsstrahlung X-rays from a radioactive source, and wherein said first and second targets have characteristic fluorescent X-rays of energies respectively within bands 5% below and 5% above an absorption edge of the required element.

3. Apparatus for use in determining the concentration of a required element in a mixture, comprising a radioactive continuous spectrum source of X-rays, two targets constituted by elements having respectively different characteristic fluorescent X-ray energies in a band within 5% below an absorption edge of said required element and in a band within 5% above said absorption edge, said targets being located so that one selectively receives X-rays from said source, X-ray detection means located to measure the intensity of the fluorescent X-rays from the target receiving X-rays from the source, means for containing and locating a sample of the mixture between said targets and said detection means, a pair of differential filters for association with each target, located between the X-ray detection means and the means for containing the said sample of the mixture, one filter of each pair being selected to have an absorption edge slightly below the energy of the fluorescent X-rays of its associated target and the other filter of each pair being selected to have an absorption edge slightly above the energy of the fluorescent X-rays of its associated target, the absorption characteristics of the filters being essentially the same at energies outside the energy band between the absorption edges of the said filters.

4. Apparatus for use in determining the concentration of a required element in a mixture, comprising a radioactive continuous spectrum source of X-rays, two targets constituted by elements having respectively a characteristic fluorescent X-ray energy within 5% below an absorption edge of said required element and a different characteristic fluorescent X-ray energy within 5% above said absorption edge, said targets being located so that one selectively receives X-rays from said source, a scintillation counter located to measure the intensity of the fluorescent X-rays from the target receiving X-rays from the source, means for containing and locating a sample of the mixture between said targets and said scintillation counter, and a pair of differential filters for association with each target and located between the scintillation counter and the means for containing the said sample of the mixture, one filter of each pair being selected to have an absorption edge slightly below the energy of the of the fluorescent X-rays of its associated target and the other filter of each pair being selected to have an absorption edge slightly above the energy of the fluorescent X-rays of its associated target, the absorption characteristics of the filters being essentially the same at energies outside the energy band between the absorption edges of the said filters.

5. Apparatus for use in determining the concentration of a required element in a mixture, comprising a radioactive continuous spectrum source of X-rays, two targets constituted by elements having different characteristic fluorescent X-ray energies respectively within 5% below an absorption edge of said required element and within 5% above said absorption edge, means whereby either one of the targets may be positioned to receive X-rays from the said radioactive source, X-ray detection means located to measure the intensity of the fluorescent X-rays from the target receiving X-rays from the source, means for containing and locating a sample of the mixture between said target and said detection means, and a pair of differential filters for association with each target and located between the X-ray detection means and the means for containing the said sample of the mixture, one filter of each pair being selected to have an absorption edge slightly below the energy of the fluorescent X-rays of its associated target and the other filter of each pair being selected to have an absorption edge slightly above the energy of the fluorescent X-rays of its associated target, the absorption characteristics of the filters being essentially the same at energies outside the energy band between the absorption edges of the said filters.

6. Apparatus for use in determining the concentration of a required element in a mixture, comprising a radioactive continuous spectrum source of X-rays, two targets constituted by elements having different characteristic fluorescent X-ray energies respectively within 5% below an absorption edge of said required element and within 5% above said absorption edge, said targets being located so that one selectively receives X-rays from said source, X-ray detection means located to measure the intensity of the fluorescent X-rays from the target receiving X-rays from the source, means for containing and locating a sample of the mixture between said target and said detection means, and a pair of differential filters for association with each target and located between the X-ray detection means and the means for containing the said sample of the mixture, one filter of each pair being selected to have an absorption edge slightly below the energy of the fluorescent X-rays of its associated target and the other filter of each pair being selected to have an absorption edge slightly above the energy of the fluorescent X-rays of its associated target, the absorption characteristics of the filters being essentially the same at energies outside the energy band between the absorption edges of the said filters, one filter of each pair of differential filters being made of said required element.

7. Apparatus for use in determining the concentration of a required element in a mixture, comprising a radioactive continuous spectrum source of X-rays, a first target and a second target constituted respectively by an element having a characteristic fluorescent X-ray energy within a band not more than 5% below an absorption edge of said required element and an element having a different characteristic fluorescent X-ray energy within a band not more than 5% above said absorption edge, said targets being located so that one selectively receives X-rays from said source, X-ray detection means located to measure the intensity of the fluorescent X-rays from the target receiving X-rays from the source, means for containing and locating a sample of the mixture between said target and said detection means, three filters located between the X-ray detection means and the means for containing the said sample of the mixture, the first of said filters being selected to have an absorption edge slightly below the energy of the fluorescent X-rays of the said first target, the second of said filters being made of the required element and the third filter being selected to have an absorption edge slightly above the energy of the fluorescent X-rays of the said second target, and means for selectively moving the filters.

8. Apparatus for use in determining the concentration of a selected element in a mixture including said element by an X-ray absorption analysis technique, said apparatus comprising a radioactive continuous spectrum source of X-rays, a first target and a second target constituted respectively by an element having a characteristic fluorescent X-ray energy within a band not more than 5% below the K absorption edge of said selected element and an element having a different characteristic fluorescent X-ray energy within a band not more than 5% above said K absorption edge, said targets being located so that one selectively receives X-rays from said source, X-ray detection means located to measure the intensity of the fluorescent X-rays from the target receiving X-rays from the source, means for containing and locating a sample of the mixture between said target and said detection means, and first, second and third filters located between the X-ray detection means and the means for containing the said sample of the mixture, the said first filter being selected to have an absorption edge slightly below the energy of the fluorescent X-rays of the said first target, the said second filter being made of the said selected element and the said third filter being selected to have an absorption edge slightly above the energy of the fluorescent X-rays of the said second target, the absorption characteristics of the said three filters being essentially the same at energies outside the energy bands between the respective absorption edges of the said filters, and means mounting the filters for selective movement.

9. Apparatus for the continuous determination of the concentration of a required element in a mixture, comprising two similar radioactive continuous spectrum sources of X-rays, a first target constituted by an element having a characteristic fluorescent X-ray energy within a band not more than 5% below an absorption edge of said required element and a second target constituted by an element having a different characteristic fluorescent X-ray energy within a band not more than 5% above said absorption edge, said first target being located so as to receive X-rays from one of said sources, and said second target being located so as to receive X-rays from the other of said sources, two X-ray detection means associated with each of said sources and located to measure the intensity of the fluorescent X-rays from the target associated with the source with which the respective two detection means are associated, means for containing and locating a sample of the mixture between each of said targets and associated detection means, a filter for association with each detection means and located between the detection means and the means for containing the said sample of the mixture, wherein the pair of filters associated with the two detection means associated with the said first target form a pair of differential filters and a pair of filters associated with the two detection means associated with the said second target form a further pair of differential filters, one filter of each pair being selected to have an absorption edge slightly below the energy of the fluorescent X-rays of its associated target and the other filter of each pair being selected to have an absorption edge slightly above the energy of the fluorescent X-rays of its associated target, the absorption characteristics of all the filters being essentially the same at energies outside the energy bands between the respective absorption edges of the said filters, means to determine the difference between the intensities measured by the two detection means associated with the said first target, means to determine the difference between the intensities measured by the two detection means associated with the said second target, and means to determine the ratio of the said differences.

10. Apparatus for determining the concentration of a required element in a mixture, comprising a radioactive continuous spectrum source of X-rays, two targets constituted by elements having different characteristics fluorescent X-ray energies respectively within a band not more than 5% below an absorption edge of said required element and not more than 5% above said absorption edge, said targets being located so that one selectively receives X-rays from said source, X-ray detection means located to measure the intensity of the fluorescent X-rays from the one said target receiving X-rays from the source, means for containing and locating a sample of the mixture between said one target and said detection means, and a pair of differential filters for association with each target, and located between the X-ray detection means and the means for containing the said sample of the mixture, one of said filters of each pair being selected to have an absorption edge slightly below the energy of the fluorescent X-rays of its associated target and the other filter of each pair being selected to have an absorption edge slightly above the energy of the fluorescent X-rays of its associated target, the absorption characteristics of the filters being essentially the same at energies outside the energy band between the absorption edges of the said filters, and means to receive and record the intensities of X-rays generated by said two targets each as combined with each of its pair of filters as measured by said detection means after passage through a sample.

References Cited by the Examiner
UNITED STATES PATENTS

| | | | |
|---|---|---|---|
| 2,610,301 | 9/1952 | Hansen | 250—51.5 |
| 2,925,497 | 2/1960 | Bessen | 250—51.5 |
| 2,928,944 | 3/1960 | Reiffel | 250—51.5 |
| 2,947,871 | 8/1960 | Friedman | 250—83.3 |
| 2,963,585 | 12/1960 | Beeh | 250—83.3 |
| 3,114,832 | 12/1963 | Alvarez | 250—51.5 |

OTHER REFERENCES

"Beta-Excited X-Ray Sources for Scintillation-Spectrometry Calibration," by J. G. Kereiakes et al., from Nucleonics, vol. 16, No. 1, January 1958, pp. 80–82.

RALPH G. NILSON, *Primary Examiner.*

W. F. LINDQUIST, *Assistant Examiner.*